E. E. WOLF.
WEIGHT RECORDING APPARATUS.
APPLICATION FILED JUNE 4, 1915.

1,295,406.

Patented Feb. 25, 1919.
5 SHEETS—SHEET 1.

Inventor:
Elmer E. Wolf
By Adams & Jackson
Att'ys.

E. E. WOLF.
WEIGHT RECORDING APPARATUS.
APPLICATION FILED JUNE 4, 1915.

1,295,406.

Patented Feb. 25, 1919.
5 SHEETS—SHEET 2.

Fig. 3

Inventor:
Elmer E. Wolf
By Adams & Jackson
Att'ys

E. E. WOLF.
WEIGHT RECORDING APPARATUS.
APPLICATION FILED JUNE 4, 1915.

1,295,406.

Patented Feb. 25, 1919.
5 SHEETS—SHEET 3.

Inventor:
Elmer E. Wolf
By Adams & Jackson
Attys.

E. E. WOLF.
WEIGHT RECORDING APPARATUS.
APPLICATION FILED JUNE 4, 1915.

1,295,406.

Patented Feb. 25, 1919.
5 SHEETS—SHEET 4.

Inventor:
Elmer E. Wolf
By Adams & Jackson
Att'ys

UNITED STATES PATENT OFFICE.

ELMER E. WOLF, OF SPRINGFIELD, OHIO, ASSIGNOR TO AMERICAN AUTOMATIC SCALE COMPANY, OF CHICAGO, ILLINOIS, A CORPORATION OF ILLINOIS.

WEIGHT-RECORDING APPARATUS.

1,295,406.      Specification of Letters Patent.      Patented Feb. 25, 1919.

Application filed June 4, 1915. Serial No. 32,079.

*To all whom it may concern:*

Be it known that I, ELMER E. WOLF, a citizen of the United States, residing at Springfield, in the county of Clark and State of Ohio, have invented certain new and useful Improvements in Weight-Recording Apparatus, of which the following is a specification, reference being had to the accompanying drawings.

This invention relates to weight recording apparatus of the general type shown in an application for patent by Louis Ashley Osgood, Serial No. 843,166, filed June 5, 1914, comprising means for locking a lightly-movable indicating hand against movement from the point where it comes to rest in a weighing operation, together with means controlled by the position of the locked hand for recording the weight indicated. My improved recording apparatus is designed especially for use with weighing apparatus of the type shown in another application for patent by Louis Ashley Osgood, Serial No. 835,870, filed May 2, 1914. As is fully set forth in the Osgood application first-above referred to, it is important for the purpose of securing accurate results in a weighing apparatus that the weight-indicating means be given as free a movement as is possible, this end being attained in my device by making the weight-indicating means as light as possible, it being feasible at the end of the weighing operation to manually position a comparatively heavy independently-movable recording mechanism by reference to the indicating means, the lightly-moving indicating mechanism being adapted thus to assume position entirely independently of the comparatively heavier recording mechanism. It is one of the objects of my invention to provide new and improved means for recording an indicated weight in a scale of this type. It is another object of my invention to provide new and improved means for limiting the manual adjustment of the recording means as it is turned in being set to correspond to the position of the weight-indicating means. It is another object of my invention to provide new and improved means for locking in position a lightly-movable indicating hand so as to permit the recording mechanism to be automatically set relative thereto through the medium of power applied manually or in any other manner independently of the weighing operation. It is another object of my invention to provide new and improved means for locking lightly in position the weight-indicating means at the commencement of the operation of setting the recording mechanism after the end of the weight-indicating movement. It is another object of my invention to improve weight-recording mechanism of this general type in sundry details hereinafter pointed out. The preferred means by which I have accomplished the objects of my invention are illustrated in the accompanying drawings and are hereinafter specifically described. That which I believe to be new and desire to cover by this application is set forth in the claims.

In the drawings:—

Figure 1 is a front view of the dial portion of a weighing apparatus embodying my improved construction;

Fig. 2 is a view illustrating conventionally the connection of the weight recording mechanism to a weighing apparatus of the type above referred to;

Referring to the several figures of the drawings in which corresponding parts are indicated by the same reference characters, 20 indicates the framework of a weighing apparatus equipped with my improvements comprising a drum or cylinder 21 in which the recording mechanism is located. An arm 22 extends upward from the front edge of the drum 21 and is provided with a block or lug 23 extending rearwardly from its upper end, upon which block is mounted a circular plate 24, in the construction shown the plate 24, block 23 and arm 22 being formed integrally with each other and integrally with the drum 21. Depending from the front edge of the drum 21 at its upper portion is another arm 25 having secured upon it by means of screws 26 (see Fig. 1) a bearing plate 27. Mounted in suitable bearings in the plates 27 and 24 is a spindle 28 provided with an indicating hand 29 adapted to rotate with the spindle 28 from one side of the arm 25 to the opposite side thereof in front of a suitably graduated dial 30 secured in position in the framework 20. The spindle 28 is also provided with a finger 31, the turned end 32 of which is adapted upon the rotation of the spindle 28 to be moved about the periphery of the plate 24 in close proximity thereto, the finger 31 moving from one side to the other of the block 23 as the hand 29 moves from one side to the other of the arm 25. The spindle 28 is provided with a pinion 33 with which meshes a rack-bar 34 adapted to be connected in any suitable manner with a weigh-beam 35 of the type shown in the Osgood application 835,870, above referred to. A glass plate 36 is held in position by a circular frame 37 for closing the front end of the drum 21.

Figures 1, 2:
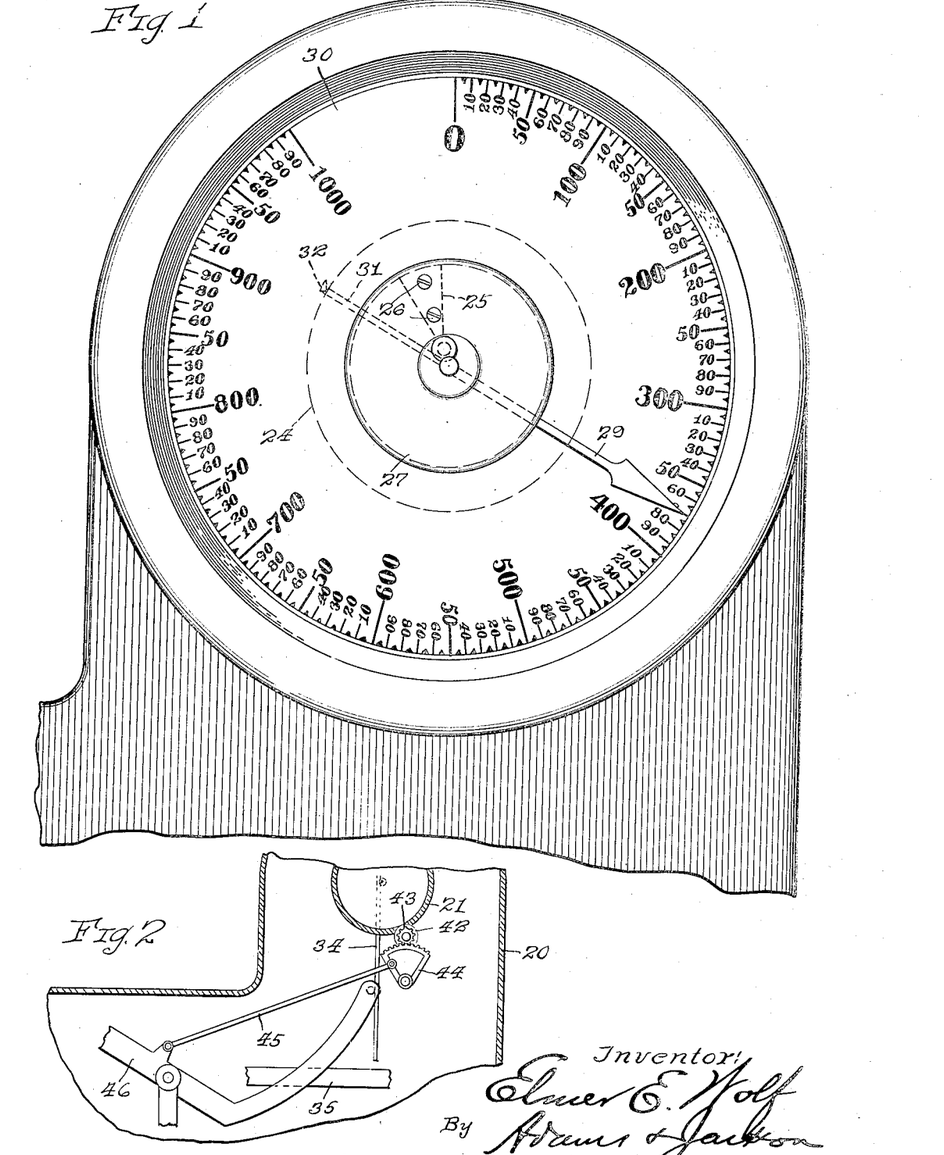
Figure 3:
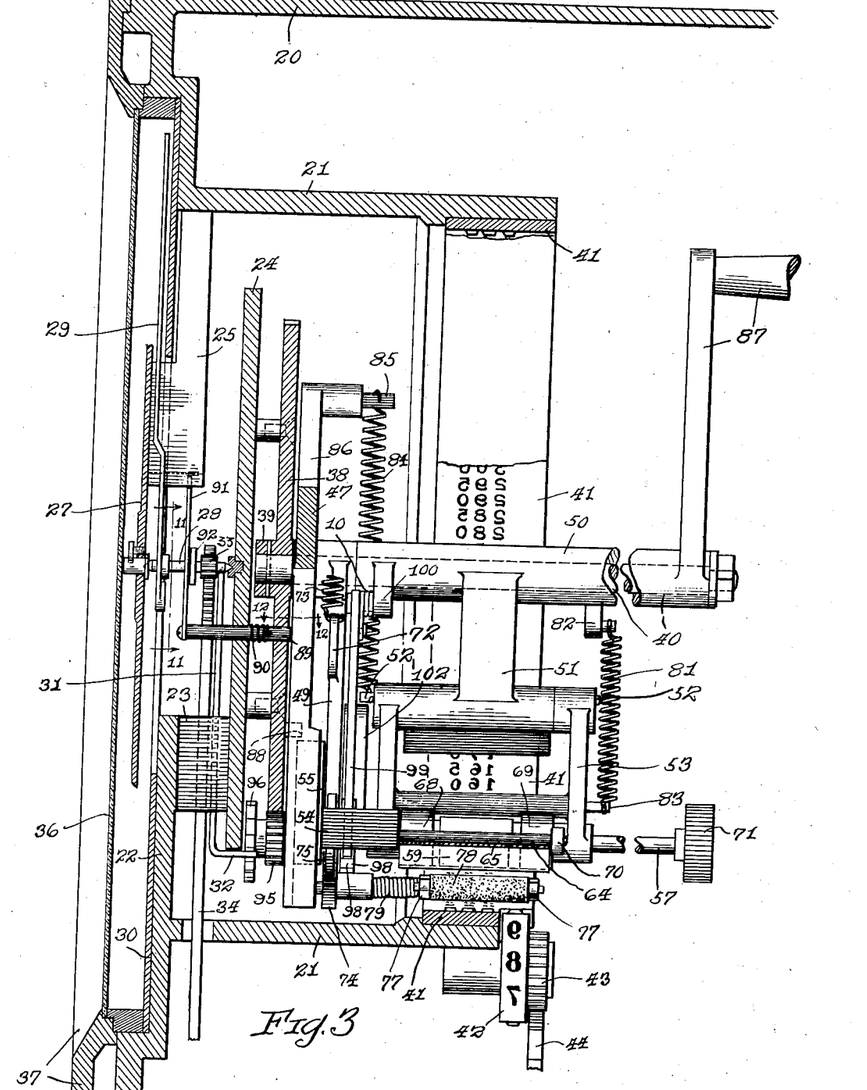
Fig. 3 is a central vertical section through my improved recording mechanism.

Fixedly mounted upon the rear face of the plate 24 and suitably spaced therefrom there is a stationary gear 38, fixed in a central hub 39 of which is a rearwardly-extending pin or shaft 40 adapted to support revolubly in position the mechanism by which a record is made in coöperation with a circular number plate 41 non-rotatably mounted circumferentially of the drum on its inner face at its rear edge. The number plate 41, as indicated by the small portion of the plate shown in Fig. 3, is provided with a series of numbers increasing by fives from 000 to 995, the numbers being spaced at equal intervals about the drum to correspond to the arrangement of the figures on the dial 30, as will be readily understood. Coöperating with the recording mechanism mounted upon the shaft 40 is a disk number device 42 revolubly mounted upon the drum 21 at its lowermost point in a suitable notch cut in the edge of the drum. The disk 42 is provided with a series of numbers from zero to nine, the disk being so positioned that any one of the numbers is adapted to be brought into uppermost position relative to the disk immediately in rear of the rearmost circumferentially-extending row of the figures of the plate 41. The disk 42 is provided with a pinion 43, which meshes with a pivotally-mounted toothed sector 44. As is best shown in Fig. 2, the sector 44 is adapted to be connected by means of a link 45 with a weight lever 46 corresponding to the weight lever 68—69 of the Osgood application 835,870, above referred to. As has been set forth above, Fig. 2 is a conventional view, it being deemed unnecessary to illustrate in this application a series of weights mounted upon the lever 46 or the weighing apparatus connected with the weigh-beam 35, only a fragmentary portion of which is shown, inasmuch as it is believed that these matters will be fully understood from a study of the applications above referred to. It will be understood that as the weight-lever 46 is turned to deposit additional weights upon the weigh-beam 35, the sector 44 will be turned in clockwise direction in Fig. 2, serving to rotate the number disk 42 in counterclockwise direction in said Fig. 2, thus bringing a higher number carried by said disk into the operative uppermost position on said disk. It will be understood that as the weigh-beam 35 is brought to a position of equilibrium upon its pivotal mounting, being moved more or less upward in such weighing operation, the rack-bar 34 will be moved upward so as to rotate the hand 29 to position relative to the dial 30 to indicate the weight of that portion of the matter being weighed in excess of the even thousands of pounds. As will be readily understood, as the hand 29 is turned to indicate the weight by reference to the dial 30, the finger 31 has its turned end 32 turned to a corresponding position adjacent to the circular plate 24.

Figures 8, 9, 10, 11, 12, 13, 14:
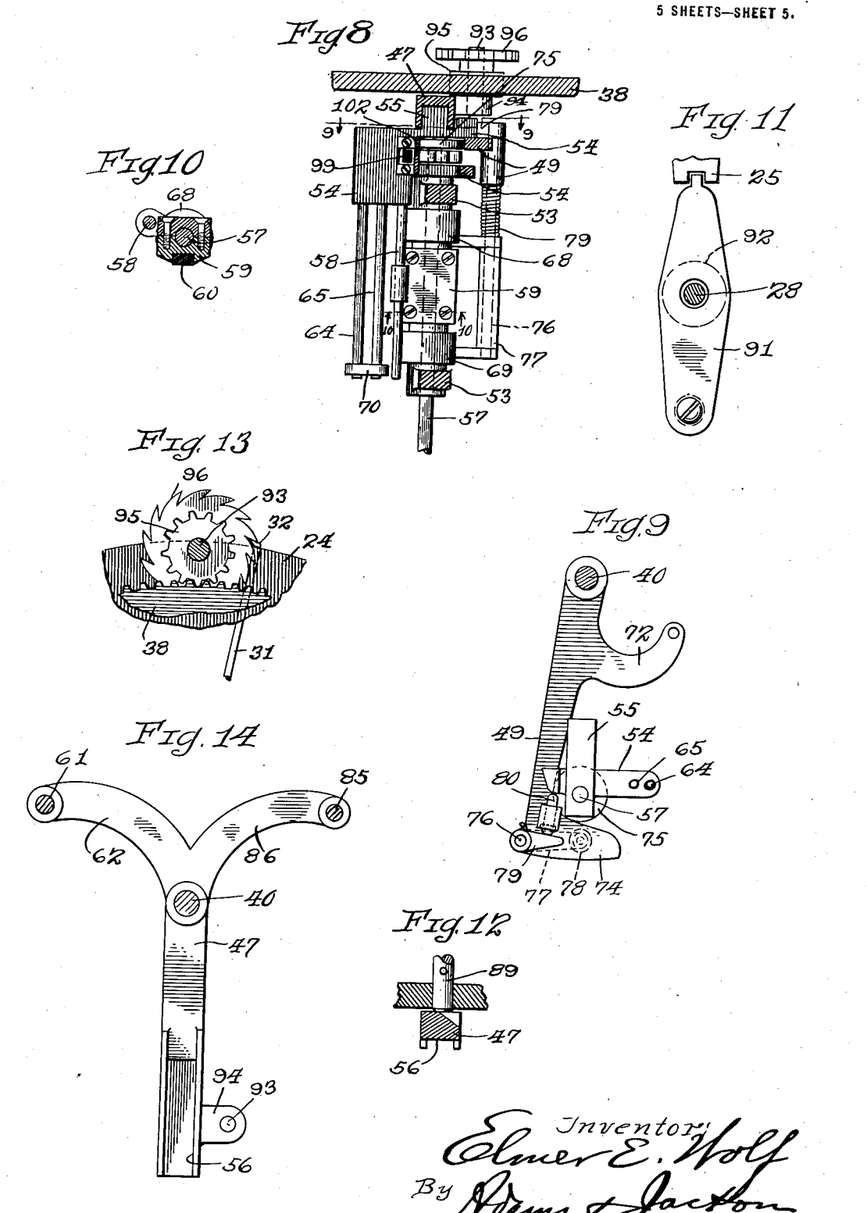
Fig. 8 is an enlarged detail of the recording mechanism, being a cross-section taken substantially on line 8—8 of Fig. 4.
Fig. 9 is a view of the pivoted arm which carries the inking roller of my recording mechanism, together with certain of the connected parts, being a view taken substantially on line 9—9 of Fig. 8.
Fig. 10 is a cross-section taken on line 10—10 of Fig. 8.
Fig. 11 is a vertical cross-section taken on line 11—11 of Fig. 3.
Fig. 12 is a cross-section taken on line 12—12 of Fig 3.
Fig. 13 is a fragmentary view, being an enlarged detail showing the means for locking the indicating hand against rotation and for automatically setting the recording mechanism relative to the position of the indicating hand.
Fig. 14 is a view of the arm by which a slideway is provided for the impression-member of my recording mechanism, as hereinafter described.

The means for recording the weight in connection with the apparatus so far described comprises a cross-head 47 revolubly mounted upon the shaft 40 adjacent to the gear 38 and adapted to carry a roll of paper 48, an arm 49 revolubly mounted upon the shaft adjacent to the cross-head 47 for supporting an inking roller as hereinafter described, and a sleeve 50 revolubly mounted upon said shaft 40 adjacent to the arm 49 thereon, the sleeve 50 being provided with mechanism by which the web of paper from the roll carried by the cross-head 47 is pressed into operative engagement with one or another of the numbers of the number plate 41 for recording the weight. The mechanism mounted upon the sleeve 50 for causing the proper impression upon the web of paper comprises an arm 51 extending from the sleeve 50 having pivotally connected to its outer end by means of a pin 52 one end of a frame 53, the opposite end of which is pivotally connected to another frame 54 provided with a slide-block 55 working in a suitable slideway 56 provided by the cross-head 47, the frame 54 being connected to the frame 53 by means of a shaft 57. In the construction shown, the frame 53 comprises two arms which are held rigid relative to each other by means of the pin 52 and the shaft 57. The frame 54 is made in the form of a casting with the block 55 formed integrally therewith, as is best shown in Fig. 8.

Revolubly mounted upon the shaft 57 is an impression-member 59 provided upon its outer face with an impression-block 60 (see Fig. 10), the member 59 being held in operative position relative to the shaft 57 by a pin 58 extending rearwardly from the frame 54 and having a suitable bearing on said member. The shaft 57 is consequently free to rotate without affecting the position of the member 59. In the construction shown the impression-member 59 is formed of two parts suitably joined together and providing between them a suitable journal for the shaft 57, as is clearly shown in said Fig. 10. The roll of paper 48 is revolubly mounted upon a pin 61 extending rearwardly from the arm 62 of the cross-head 47. The web of paper 63 (see Fig. 4) extends from the roll 48 about two pins 64—65 extending rearwardly from the frame 54, about the impression-member 59, and inward about a roller 66 mounted upon a pin 67 carried by the frame 54. Rollers 68—69 are fixedly mounted upon the shaft 57 so as to rotate therewith, the said rollers 68—69 being adapted to engage the paper 63 in its passage about the impression-member 59. The rear ends of the pins 64—65 are joined by a short bar 70. By a rotation of the shaft 57 in counterclockwise direction in Fig. 4 by means of a thumb-piece 71, or by any other suitable means, the web 63 will be fed forward from the roll 48, as will be readily understood.

Figure 4:
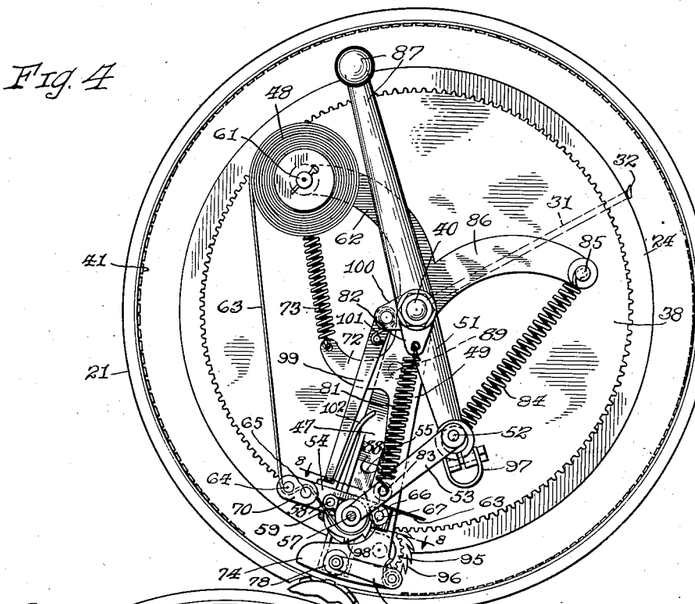
Fig. 4 is a rear view of the recording mechanism after the weighing elements have come to rest, the recording mechanism being in normal position.

As is shown in Fig. 4, the arm 49 is provided with a laterally-extending lug 72, the outer end of which is connected by a coiled spring 73 with the pin 61 carried by the arm 62 of the cross-head 47. The spring 73 thus tends to hold the arm 49 turned to the limit of its movement in clockwise direction relative to the cross-head 47 in Figs. 4 to 7, inclusive. The outer end of the arm 49 is provided with a laterally-extending cam lug 74 adapted to be engaged by a roller 75 revolubly mounted upon the shaft 57. As will be readily understood (see Fig. 9) when the roller 75 is moved outward away from the shaft 40 by the outward movement of the frame 54 as hereinafter described, the arm 49 is displaced to the left in Fig. 9, being moved in counterclockwise direction in Figs. 4 to 7. Revolubly mounted in the outer end of the arm 49 is a rock-shaft 76 having fixed upon its rear end a yoke 77 in the ends of the arms of which is revolubly mounted a circular ink pad 78. A spring 79 mounted upon the rock-shaft 76 tends to hold the inking roller 78 yieldingly in its innermost position swung out of contact with the printing plate 41. The front end of the rock-shaft 76 is provided with an arm 79 adapted to be swung outward through the medium of a pin 80 slidably mounted upon the arm 49 when the said pin 80 is moved outward by reason of the outward movement of the frame 54 which contacts the said pin. Upon an outward movement of the frame 54, the ink roller 79 is first moved outward into contact with the printing plate 41 through the medium of the pin 80. As the frame 54 continues its outward movement, the arm 49 is forced to the left in Fig. 9, causing the ink roller 78 to be moved to the left in Fig. 9 in its outermost position, serving thus to properly ink that portion of the plate 41 with which the roller 78 is brought in contact.

Figure 5:
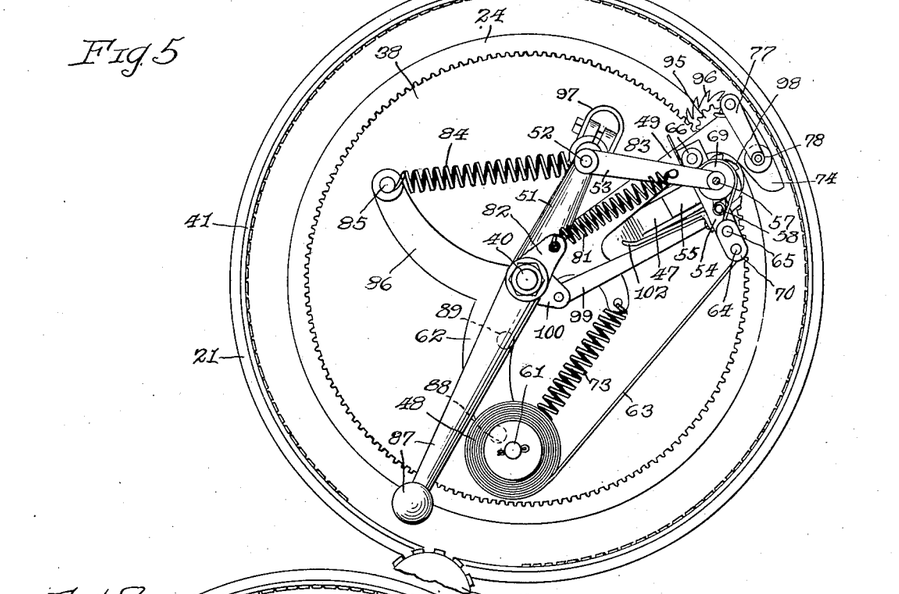
Fig. 5 is a view similar to Fig. 4, but with the recording mechanism set in position relative to the weight-indicating means for recording the weight indicated.
Figure 6:
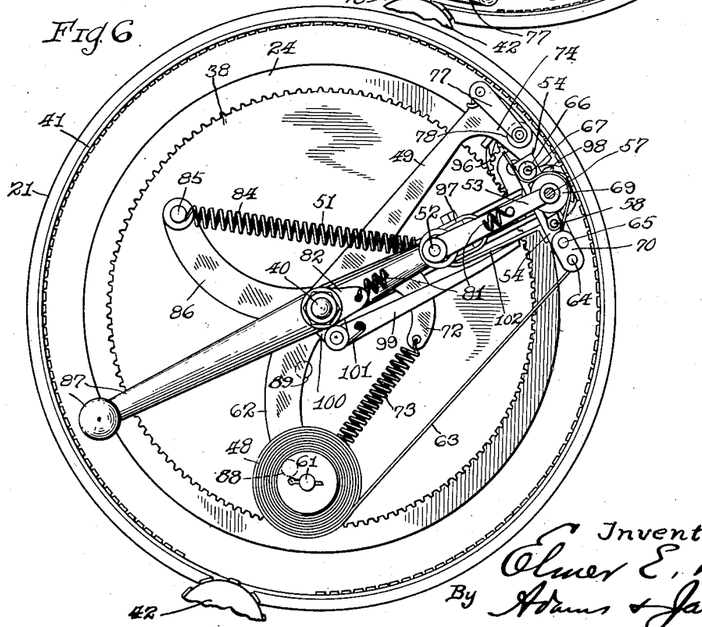
Fig. 6 is a view similar to Fig. 5, but with the recording mechanism in changed position in the process of recording the weight.
Figure 7:
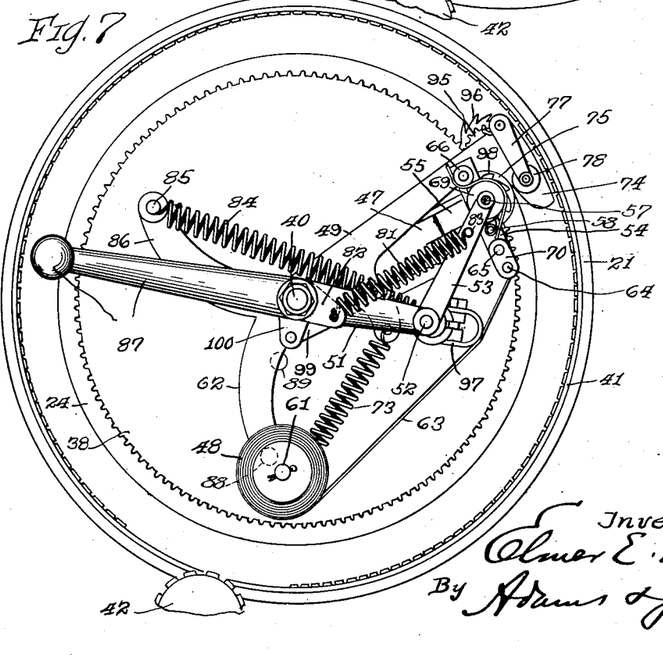
Fig. 7 is a view similar to Fig. 6, but with the initial recording operation completed ready for a shifting of the recording mechanism into position for the second portion of the weight-recording operation, as hereinafter described.

A spring 81 is connected at one end to the sleeve 50 by means of a lug 82, being connected at its other end to a pin 83 extending from the rear face of the frame 53, the spring 81 tending thus to hold the frame 54 in its innermost position, as shown in Figs. 4, 5 and 7, whether the arm 51 and frame 53 be buckled in one direction relative to each other as shown in Fig. 5 or in the opposite direction as shown in Fig. 7. Another spring 84 is connected at one end with the spring 52 and at its opposite end to a pin 85 carried by the arm 86 forming a part of the cross-head 47. The spring 84 serves to take up lost play between the cross-head 47 and the means for operating the impression member, serving to steady the parts without in any way interfering with their proper operation. A handle 87 is mounted upon the sleeve 50 for operating the mechanism, as hereinafter described.

With the recording mechanism in the position shown in Fig. 4, the cross-head 47 will be held against movement in counter-clockwise direction therein by a lug 88 (see Fig. 3) mounted upon the rear face of the gear 38. With the number-device 42 rotated by a weighing operation so as to bring the proper number carried thereby into uppermost position relative thereto to indicate the number of thousands of pounds balanced by the weights deposited upon the weigh-beam 35 by the weight-lever 46 as above described, and with the hand 29 in turned position to indicate upon the dial 30 the weight above even thousands, with the finger 31 in a position corresponding to the position of the hand 29, the apparatus will be in condition for operation for recording the weight. For the accomplishment of this purpose the operator will grasp the handle 87 and swing it in clockwise direction in Fig. 4 about the shaft 40. By reason of the connection of the several parts which are revolubly mounted upon the shaft 40, the entire recording mechanism will be moved in clockwise direction in said Fig. 4 into a changed position relative to the stationary number plate 41, as shown in Fig. 5. Upon the start of the movement of the cross-head 47 in clockwise direction in Figs. 4 to 7, the cross-head 47 (see Fig. 12) is moved out of contact with a pin 89 slidably mounted in the plate 24 and the gear 38, being held yieldingly in its rearmost position by a spring 90, as best shown in Fig. 3, permitting the said pin to move backward slightly carrying with it a plate 91, which is mounted upon the pin 89 at one end, having sliding connection with the frame-arm 25 at its other end. The backward movement of the plate 91 serves to bring such plate into contact with a plate 92 fixed upon the spindle 28, by which the hand 29 is frictionally held against rotation until the plate 91 is again moved out of contact with the plate 92 by the return of the cross-head 47 into normal position for moving the pin 89 again forward.

The means for stopping the rotation of the recording mechanism in clockwise direction in Fig. 4 as it is moved through the medium of the handle 87 for a recording operation, comprises a pin 93 fixedly mounted in a lug 94 (see Figs. 8 and 14) extending from the cross-head 47 near one end thereof, said pin 93 having revolubly mounted thereon a pinion 95 which meshes with the gear 38. Revolubly mounted upon the pin 93 and adapted to rotate with the pinion 95 adjacent to the circular plate 24 is a ratchet-wheel 96. As the recording mechanism is moved in clockwise direction in Fig. 4, the pinion 95 and the ratchet-wheel 96 will be rotated in clockwise direction upon the pin 93 by reason of the intermeshing of the gear 38 and the pinion 95, as well as being moved in clockwise direction about the shaft 40. When the ratchet-wheel 96 is brought into contact with the turned end 32 of the finger 31, the rotation of the ratchet-wheel and of the pinion 92 is promptly stopped, serving thus to stop the forward movement of the recording mechanism about the shaft 40. As will be readily understood from the description heretofore given, the number on the printing plate 41 in operative position relative to which the recording mechanism is thus automatically stopped corresponds to the number on the dial indicated by the hand 29.

It will be understood that the operation of printing a record takes considerable power. As a scale has weak inherent motive power the printing or recording is preferably effected by a mechanism which I will term broadly a follow up mechanism. In the present embodiment this follow up mechanism is manually actuated to follow up and be limited in its extent of movement by a scale moved part. Part 31, 32, it will be understood moves proportionally to the displacement of the scale about the periphery of a disk 24. When the follow up mechanism is arrested in its movement it is desirable that the shock of impact should not displace the part 31—32 in its direction of translation or angularly about its axis of rotation. The construction just described is particularly adapted to accomplish these results since the rotating ratchet 96 is adapted to react against the scale positioned part 32 in an axial direction rather than circumferentially. An axial pressure on part 32 does not tend to displace said part angularly or circumferentially and thereby cause erroneous records. Furthermore excessive strain is not transmitted to the spindle 29 as the pressure is taken up by disk 24 over which the end of 32 extends. It will also be understood that part 31—32 is freely movable and unlocked until the instant the ratchet 96 engages it. It then is temporarily locked by the ratchet 96. This is advantageous in that it gives the part 96 the maximum of time to come to a position of rest, since the locking up is not effected until substantially the end of the movement of the follow up devices.

With the recording mechanism stopped in the position shown in Fig. 5 in proper position for recording the weight indicated by the hand 29 on the dial 30, the further movement of the handle 50 in clockwise direction in Fig. 5 about the shaft 40 serves to swing the arm 51 relative to the cross-head 47. As will be readily understood, upon the start of this movement the frame 54 is moved outward through the medium of the link 53 causing a displacement of the arm 49 in counterclockwise direction in said Fig. 5 and causing the roller 78 to ink the proper one of the numbers on the printing plate 41. As the movement of the arm 51 continues relative to the cross-head 47 the arm 49 is displaced entirely in the continued outward movement of the frame 54, permitting the impression-block 60 of the impression-member 59 to bring the web 63 squarely in contact with the inked number for causing a proper impression thereof upon the web. As the movement of the handle 87 and the arm 51 in clockwise direction from the recording position in Fig. 6 still continues, the frame 54 is again moved inward into the position shown in Fig. 7. A shield 97 is provided for the outer end of the arm 51 for preventing the said arm from breaking the web 63 when the parts are in the position shown in Fig. 7. As the plate 54 moves inward as the parts are moved out of the position shown in Fig. 6 as above described, the arm 49 is permitted to move in clockwise direction in Fig. 6 again into close proximity to the cross-head 47 under the influence of the spring 73.

When the fraction of a thousand pounds has been thus recorded upon the web 63, the operator moves the handle 87 in counterclockwise direction in Fig. 7 until the cross-head 47 is brought into contact with the stop 88. Upon the continued rotation of the handle 87 in counterclockwise direction, turning the arm 51 in clockwise direction relative to the cross-head 47, the frame 54 will be again moved outward, serving to move the inking roller 78 over the uppermost figure carried by the disk 42 and serving to force the impression-member 59 with the web of paper into contact with said inked number for completing the record of the weight, as will be readily understood, a still further continuation of the movement of the handle 87 serving to bring the recording mechanism back to the position and condition shown in Fig. 4.

Means is provided for advancing the web of paper 63 between each two successive recording operations. This means comprises a ratchet-wheel 98 fixed upon the shaft 57. A pawl 99 is pivotally mounted upon a lug 100 extending from the sleeve 50, being provided with a spring 101 tending to hold the pawl 99 yieldingly in contact with the ratchet-wheel 98. A guide 102 is mounted upon the frame 54 against which the pawl 99 is adapted to bear when it is retracted out of engagement with the ratchet-wheel so as to cause the pawl to be brought again into contact with the ratchet-wheel at the proper moment. The lug 100 is so positioned upon the sleeve 50 that as the plate 54 is moved inward into the position shown in Fig. 7 the end of the pawl 99 is not brought into contact with the teeth of the ratchet-wheel 98. When, however, the mechanism is moved into the position shown in Fig. 4, with the lug 100 extending rather toward the ratchet-wheel instead of away therefrom, the end of the pawl 99 is brought into engagement with the teeth of the ratchet-wheel 98 serving to rotate the shaft 57 and the rollers 68—69 serving to advance the web 63, as will be readily understood.

I do not wish to cover by my claims anything shown or disclosed by the Osgood applications hereinabove referred to, inasmuch as I am not the inventor of the subject-matter of these applications or either of them.

My improved follow up mechanism it will be understood is equally adapted for use in connection with mechanism other than the specific recording mechanism shown. In fact the said mechanism may be used with many different sorts of mechanisms used in conjunction with a scale set part or member. My invention is susceptible to various changes and in various embodiments and it will be understood that the scope of my invention is more particularly pointed out in the appended claims.

What I claim as my invention and desire to secure by Letters Patent, is:—

1. In an indicating and recording mechanism, the combination of indicating means, recording mechanism, means for setting the said recording mechanism for taking a record to correspond with the indication, a rotatable member associated with said setting means and adapted to be given a plurality of complete rotations upon an operation of setting said recording member, and means adapted to move to correspond with the indication adapted to engage said rotatable member and stop its rotation and serving thus to stop the setting operation at the time when the recording mechanism is brought to condition to record the indication.

2. In an indicating mechanism, the combination of recording mechanism comprising two members one of which is movable relative to the other for setting the mechanism for recording different indications, a rotary device carried by said movable member and adapted to be rotated by the movement of said movable member relative to the other member, and means controlled by the operation of the indicating mechanism for stopping the rotation of said rotary device as said recording means is being set serving to stop the setting operation at the time when the recording mechanism is brought to condition to record the indication.

3. In an indicating mechanism, the combination of recording means adapted to be set for recording the different indications, comprising a graduated member and a coöperating recording member, one of said members being movable relative to the other, a rotary device carried by said movable member and adapted to be rotated by the movement of said movable member relative to the other member, and means controlled by the operation of the indicating mechanism for stopping the rotation of said rotary device as said recording means is being set serving to stop the setting operation at the time when the recording member is brought to condition to record the indication.

4. In an indicating mechanism, the combination of recording mechanism comprising two members one of which is movable relative to the other for setting the mechanism for recording the different indications, a rotary device carried by one of said members adapted to be rotated by the movement of said movable member relative to the other member, and means controlled by the operation of the indicating mechanism for stopping the rotation of said rotary device as said recording mechanism is being set serving to stop the setting operation at the time when the recording mechanism is brought to condition to record the indication.

5. In an indicating mechanism, the combination of recording means adapted to be set for recording the different indications, comprising a graduated member and recording mechanism movable relative thereto, a rotatable member carried by said recording mechanism adapted to be rotated by the movement of said recording mechanism relative to said graduated member, and means controlled by the operation of the indicating mechanism for stopping the rotation of said rotatable member as said recording means is being set serving to stop the setting operation at the time when the recording mechanism is brought to condition to record the indication.

6. In an indicating mechanism, the combination of indicating means, a numbered printing plate graduated to correspond with the indicating means, impression mechanism adapted to be moved along said printing plate, and means controlled by the operation of the indicating mechanism for stopping the forward movement of the impression mechanism when it reaches the position for recording the indication.

7. In an indicating mechanism, the combination of indicating means, a numbered printing plate graduated to correspond with the indicating means, impression mechanism adapted to be moved along said printing plate, means for moving said impression mechanism along said printing plate, and means controlled by the operation of the indicating mechanism for stopping the forward movement of the impresion mechanism when it reaches the position for recording the indication, the continued forward movement of the moving means after the impression mechanism has been stopped in position for recording an indication being effective to operate the impression mechanism for making the record.

8. In an indicating mechanism, the combination of indicating means, a circular numbered printing plate graduated to correspond with the indicating means, impression mechanism adapted to be revolved concentrically about said printing plate, means for revolving the said impression mechanism and for operating the same when it is brought to a stop opposite a number on the printing plate, and means controlled by the operation of the indicating mechanism for stopping the forward movement of the impression mechanism when it reaches the position for recording the indication.

9. In an indicating mechanism, the combination of indicating means, a circular numbered printing plate graduated to correspond with the indicating means, impression mechanism adapted to be revolved concentrically about said printing plate, a crank connected with said impression mechanism for moving it bodily along said printing plate, and means controlled by the operation of the indicating mechanism for stopping the forward movement of the impression mechanism when it reaches the position for recording the indication, the continued forward movement of said crank after the impression mechanism has been stopped in position for recording an indication being effective to operate the impression mechanism for making the record.

10. In an indicating mechanism, the combination of indicating means, recording mechanism, means for setting said recording mechanism for recording different indications, a toothed wheel adapted to be rotated by the setting operation, and a finger controlled by the operation of the indicating mechanism adapted to be engaged by a tooth of said wheel for stopping the rotation of the wheel serving thus to stop the setting operation at the time when the recording mechanism is brought to condition to record the indication.

11. In an indicating mechanism, the combination of indicating means, a numbered printing plate graduated to correspond with the indicating means, impression mechanism adapted to be moved along said printing plate, a toothed wheel adapted to be rotated upon the forward movement of the impression mechanism along said printing plate, and a finger controlled by the operation of the indicating mechanism adapted to be engaged by a tooth of said wheel for stopping the rotation of the wheel and the forward movement of the impression mechanism when the impression mechanism reaches the position along the printing plate for recording the indication.

12. In an indicating mechanism, the combination of a graduated dial, a lightly-movable indicating hand adapted to be moved along said dial, recording mechanism, means for setting said recording mechanism for recording different indications, a rotatable member adapted to be rotated by the setting operation, and a finger movable with said hand adapted to engage said rotatable member and to stop its rotation and the forward movement of the recording mechanism when the recording mechanism is brought to condition to record the indication.

13. In an indicating mechanism, the combination of a graduated dial, a lightly-movable indicating hand adapted to be moved along said dial, a numbered printing plate graduated to correspond with the indicating means, impression mechanism adapted to be moved along said printing plate, a toothed wheel adapted to be rotated upon the forward movement of the impression mechanism along said printing plate, and a finger movable with said hand adapted to engage a tooth of said wheel and to stop the rotation of the wheel and the forward movement of the impression mechanism when the impression mechanism reaches the position along the printing plate for recording the number indicated by the hand.

14. In an indicating mechanism, the combination of a swingingly-mounted beam, a swingingly-mounted finger operatively connected with said beam and adapted to be swung by the movement of the beam in proportion to the power by which the beam is actuated, recording mechanism, means for setting said recording mechanism for making different records, and means limited by contact with said finger for stopping the operation of setting the recording mechanism in accordance with the position of the finger whereby the recording mechanism is brought to condition to make a record corresponding with the position of the beam and corresponding with the power by which the beam is actuated, the operative contact between said finger and said means for controlling the setting of the recording mechanism being effected without pressure upon the finger tending to displace it from position.

15. In an indicating mechanism, the combination of a swingingly-mounted beam, a swingingly-mounted finger operatively connected with said beam and adapted to be given substantially a complete revolution about its support by a comparatively much smaller movement of said beam about its support, means for clamping said finger against movement from any assumed position, recording mechanism, means for setting said recording mechanism for making different records, and means controlled by the position of said finger when held against swinging for stopping the setting operation when the recording mechanism is brought to condition to make a record corresponding with the position of the beam.

16. In an indicating mechanism, the combination of a swingingly-mounted beam, a swingingly-mounted finger operatively connected with said beam and adapted to be given substantially a complete revolution about its support by a comparatively much smaller movement of said beam about its support, said beam and said finger being adapted to move in proportion to the power by which the beam is actuated, recording mechanism, means for setting the recording mechanism for making different records, and means limited by pressure on said finger toward the axis about which the finger swings for stopping the operation of setting the recording mechanism to correspond with the position of the finger whereby the recording mechanism is brought to condition to make a record corresponding with the position of the beam and corresponding with the power by which the beam is actuated.

17. In an indicating mechanism, the combination of a swingingly-mounted finger adapted to be given a swinging movement in proportion to the power by which it is actuated, recording mechanism, means for setting said recording mechanism for making different records, and means limited by contact with said finger for stopping the operation of setting the recording mechanism to correspond with the position of the finger whereby the recording mechanism is brought to condition to make a record corresponding with the power by which the finger is actuated, the operative contact between said finger and said means for controlling the setting of the recording mechanism being effected without pressure upon the finger tending to displace said finger from position.

18. In an indicating mechanism, the combination of a swingingly-mounted finger adapted to be given a swinging movement in proportion to the power by which it is actuated, recording mechanism, means for setting said recording mechanism for making different records, and means limited by pressure on said finger toward the axis about which the finger swings for stopping the operation of setting the recording mechanism to correspond with the position of the finger whereby the recording mechanism is brought to condition to make a record corresponding with the power by which the finger is actuated.

19. In an indicating mechanism, the combination of a swingingly-mounted finger adapted to be given a swinging movement in proportion to the power by which it is actuated, recording mechanism, means for setting said recording mechanism for making different records, auxiliary means for supporting the end portion of said finger against undue movement toward the axis about which the finger swings, and means limited by pressure on said end-portion of the finger toward the axis about which the finger swings for stopping the operation of setting the recording mechanism to correspond with the position of the finger whereby the recording mechanism is brought to condition to make a record corresponding with the power by which the finger is actuated.

20. In an indicating mechanism, the combination of a swingingly-mounted finger having its outer end turned laterally, said finger being adapted to be given a swinging movement in proportion to the power by which it is actuated, recording mechanism, means for setting said recording mechanism for making different records, a circular member about which the turned end of said finger revolves and against which such turned end is adapted to be pressed, and means limited by pressure on said turned end of the finger toward said circular member for stopping the operation of setting the recording mechanism to correspond with the position of the finger whereby the recording mechanism is brought to condition to make a record corresponding with the power by which the finger is actuated.

21. In an indicating mechanism, the combination of a swingingly-mounted finger having its outer end turned laterally, said finger being adapted to be given a swinging movement in proportion to the power by which it is actuated, recording mechanism, means for setting said recording mechanism for making different records, a circular member about which the turned end of said finger revolves and against which such turned end is adapted to be pressed, and means for clamping the turned end of said finger against said circular member serving to hold the finger against movement and serving also to stop the operation of setting the recording mechanism to correspond with the position of the finger whereby the recording mechanism is brought to condition to make a record corresponding with the power by which the finger is actuated.

22. In an indicating mechanism, the combination of a swingingly-mounted finger adapted to be given a swinging movement in proportion to the power by which it is actuated, recording mechanism, means for setting said recording mechanism for making different records, and means limited by contact with said finger for stopping the operation of setting the recording mechanism to correspond with the position of the finger whereby the recording mechanism is brought to condition to make a record corresponding with the power by which the finger is actuated, said means for controlling the setting of the recording mechanism by contact with said finger serving also to hold said finger against displacement from position.

23. In an indicating mechanism, the combination of a swingingly-mounted finger adapted to be given a swinging movement in proportion to the power by which it is actuated, recording mechanism, means for setting said recording mechanism for making different records, and a rotatable member adapted to be rotated by the operation of setting the recording mechanism, said rotatable member being adapted to be brought by the setting operation into contact with said finger and to have its rotation stopped thereby serving thus to control the setting operation to correspond with the position of the finger.

24. In an indicating mechanism, the combination of a swingingly-mounted finger adapted to be given a swinging movement in proportion to the power by which it is actuated, recording mechanism, means for setting said recording mechanism for making different records, and a rotatable member adapted to be rotated by the operation of setting the recording mechanism, said rotatable member being adapted to be brought by the setting operation into contact with said finger and to have its rotation stopped thereby serving thus to control the setting operation to correspond with the position of the finger, the contact of said rotatable member with said finger serving also to hold the finger against displacement from position.

25. In an indicating mechanism, the combination of a swingingly-mounted finger adapted to be given a swinging movement in proportion to the power by which it is actuated, recording mechanism comprising a member movable about the axis of said finger, by the movement of which member the recording mechanism is set for making different records, a rotatable member carried by said recording mechanism adapted to contact said finger and to be held by said finger against continued rotation, and means coöperating with said rotatable member for holding the said movable member against forward movement when the rotatable member is held against rotation, serving thus to limit the operation of setting the recording mechanism.

26. In an indicating mechanism, the combination of a swingingly-mounted finger adapted to be given a swinging movement in proportion to the power by which it is actuated, recording mechanism comprising a member movable about the axis of said finger, by the movement of which member the recording mechanism is set for making different records, a rotatable member carried by said recording mechanism adapted to contact said finger and to be held by said finger against continued rotation, and intermeshing gears coöperating with said rotatable member for holding said movable member against forward movement when the rotation of said rotatable member is stopped, serving thus to limit the operation of setting the recording mechanism.

27. In an indicating mechanism, the combination of a swingingly-mounted finger adapted to be given a swinging movement in proportion to the power by which it is actuated, recording mechanism comprising a member movable about the axis of said finger, by the movement of which member the recording mechanism is set for making different records, and a rotatable member carried by said recording mechanism and rotated by the forward movement thereof adapted to contact said finger and to be held thereby against continued rotation, whereby the forward movement of said movable member is stopped, serving thus to limit the operation of setting the recording mechanism.

28. In an indicating mechanism, the combination of a swingingly-mounted beam, a swingingly-mounted finger operatively connected with said beam and adapted to be swung by the movement of the beam in proportion to the power by which the beam is actuated, recording mechanism, means for setting said recording mechanism for making different records, and a toothed wheel adapted to be rotated by the setting operation, said finger being adapted to engage said toothed wheel for stopping its rotation and thus stopping the setting operation when the recording mechanism is brought to condition to make a record corresponding to the position of the beam.

29. In an indicating mechanism, the combination of a swingingly-mounted beam, a swingingly-mounted finger operatively connected with said beam and adapted to be swung by the movement of the beam in proportion to the power by which the beam is actuated, recording mechanism, means for setting said recording mechanism for making different records, a disk about which a turned end of said finger is adapted to travel in close proximity thereto, and a toothed wheel adapted to be rotated by the setting operation adjacent to said disk and to be moved at the same time along the edge of the disk, said wheel being adapted at some point in the setting operation to engage the turned end of said finger and to press it against the edge of the disk whereby the rotation of the wheel is stopped, serving thus to stop the setting operation when the recording mechanism has been brought to condition to make a record corresponding to the position of the beam.

30. In an indicating mechanism, the combination of a swingingly-mounted beam, a swingingly-mounted finger operatively connected with said beam and adapted to be swung by the movement of the beam in proportion to the power by which the beam is actuated, a circular graduated numbered printing plate, impression mechanism adapted to be revolved concentrically about said printing plate, a disk about which a turned end of said finger is adapted to travel in close proximity thereto, a toothed wheel adapted to be moved with said impression mechanism adjacent to the periphery of said disk, and means for rotating said wheel as it moves with said impression mechanism about said printing plate, said wheel being adapted at some point in the movement of the impression mechanism about the printing plate to engage the turned end of said finger and to press it against the edge of the disk whereby the rotation of the wheel is stopped, serving thus to stop the forward movement of the impression mechanism at the point at which the impression mechanism is adapted in coöperation with the printing plate to make a record corresponding to the position of the beam.

31. In an indicating mechanism, the combination of a swingingly-mounted beam, indicating means adapted to be operated by the movement of the beam in proportion to the power by which the beam is actuated, a toothed wheel adapted to be moved relative to said indicating means, and means for rotating said wheel as it is moved relative to the indicating means, said wheel being adapted to be moved into operative engagement with said indicating means for holding it against movement.

32. In an indicating mechanism, the combination of a swingingly-mounted beam, indicating means adapted to be operated by the movement of the beam in proportion to the power by which the beam is actuated, a toothed wheel adapted to be moved relative to said indicating means, means for rotating said wheel as it is moved relative to said indicating means, said wheel being adapted to be moved into operative engagement with said indicating means for holding the indicating means against movement, and means for recording the indication.

33. In an indicating mechanism, the combination of a swingingly-mounted beam, a swingingly-mounted finger operatively connected with said beam and adapted to be swung by the movement of the beam in proportion to the power by which the beam is actuated, a toothed wheel adapted to be moved toward and from said finger, and means for rotating said wheel as it is moved relative to said finger, said wheel being adapted to be moved into operative engagement with said finger for holding the finger against movement.

34. In an indicating mechanism, the combination of a swingingly-mounted beam, a swingingly-mounted finger operatively connected with said beam and adapted to be swung by the movement of the beam in proportion to the power by which the beam is actuated, a circular disk about which a turned end of said finger is adapted to move in close proximity thereto, a toothed wheel adapted to be moved toward and from said finger about the periphery of the disk, and means for rotating said wheel as it is moved relative to the finger, said wheel being adapted to be moved into operative engagement with said finger for pressing it against said disk and for holding it against movement.

35. In an indicating mechanism, the combination of a swingingly-mounted beam, a swingingly-mounted finger operatively connected with said beam and adapted to be swung by the movement of the beam in proportion to the power by which the beam is actuated, a circular disk about which a turned end of said finger is adapted to move in close proximity thereto, an arm adapted to swing about an axis concentric with said disk, a toothed wheel revolubly mounted on said arm adjacent to the edge of said disk, and means for rotating said wheel as the wheel and the arm are moved about the said axis, said wheel being adapted to be moved into operative engagement with said finger for pressing it against said disk and for holding it against movement.

36. In an indicating mechanism, the combination of a swingingly-mounted beam, a swingingly-mounted finger operatively connected with said beam and adapted to be swung by the movement of the beam in proportion to the power by which the beam is actuated, a circular disk about which a turned end of said finger is adapted to move in close proximity thereto, an arm adapted to swing about an axis concentric with said disk, a toothed wheel revolubly mounted on said arm adjacent to the edge of said disk, a pinion rotatable with said toothed wheel, and a gear fixed relative to said disk with which gear said pinion meshes whereby said toothed wheel is rotated upon its movement with said arm about the axis of the said arm, said wheel being adapted to be moved into operative engagement with said finger for pressing it against said disk and for holding it against movement.

37. In an indicating mechanism, the combination of a swingingly-mounted beam, a swingingly-mounted finger operatively connected with said beam and adapted to be swung by the movement of the beam in proportion to the power by which the beam is actuated, a circular disk about which a turned end of said finger is adapted to move in close proximity thereto, an arm adapted to swing about an axis concentric with said disk, a toothed wheel revolubly mounted on said arm adjacent to the edge of said disk, means for rotating said wheel as the wheel and the arm are moved about the said axis, and means for swinging said arm about its axis for bringing the said wheel into operative engagement with the finger for pressing it against the disk and holding it against movement.

38. In an indicating mechanism, the combination of a swingingly-mounted beam, a swingingly-mounted finger operatively connected with said beam and adapted to be swung by the movement of the beam in proportion to the power by which the beam is actuated, recording mechanism, means for setting said recording mechanism for making different records, means actuated by the initial portion of the setting operation tending to hold said finger frictionally against movement, later-acting means for locking said finger against movement, and means controlled by the said finger for stopping the operation of setting the recording mechanism in accordance with the position of the finger whereby the recording mechanism is brought to condition to make a record corresponding with the power by which the beam is actuated.

39. In an indicating mechanism, the combination of indicating means, recording mechanism, means for setting said recording mechanism for recording the indications, means actuated by the start of the setting operation tending to hold said indicating means frictionally against movement, a rotatable member adapted to be rotated by the setting operation, and means actuated by the operation of the indicating mechanism for stopping the rotation of said rotatable member serving thus to stop the setting operation at the time when the recording mechanism is brought to condition to record the indication.

40. In an indicating mechanism, the combination of a circular numbered printing plate, an adjustable auxiliary printing disk located adjacent to said circular printing plate, impression mechanism adapted to be revolved adjacent to said circular printing plate, means for revolving said impression mechanism and for operating it in connection with said printing plate for making a record, and means for stopping the revolution of the impression mechanism in the opposite direction in proper position for making a complementary record from the auxiliary printing disk.

41. In an indicating mechanism, the combination of a circular numbered printing plate, an adjustable auxiliary printing disk located adjacent to said circular printing plate, impression mechanism adapted to be revolved adjacent to said circular printing plate, a crank adapted to revolve said impression mechanism concentrically about said printing plate, means for stopping the revolution of the impression mechanism, means actuated by the continued movement of the crank in the same direction for operating the impression mechanism in connection with said printing plate for making a record, and means for stopping the revolution of said impression mechanism in the opposite direction as it is actuated by the movement of the crank in the opposite direction in position for making a complementary record from the auxiliary printing disk, the continued movement of the crank in the last-mentioned direction after the impression mechanism is stopped in operative position relative to the auxiliary printing disk serving to operate the impression mechanism for making such complementary record.

42. In an indicating mechanism, the combination of a circular numbered printing plate, an adjustable auxiliary printing disk located adjacent to said circular printing plate, impression mechanism adapted to be revolved adjacent to said circular printing plate, indicating means, means actuated by the operation of said indicating means adapted to turn said auxiliary printing disk to proper recording position, means for revolving said impression mechanism, means controlled by the operation of the indicating mechanism for stopping the revolution of the impression mechanism when it reaches a position along the circular printing plate for recording the indication, and stationary means for stopping the revolution of the impression mechanism in the opposite direction in proper position for completing the record from the auxiliary printing disk.

43. In an indicating mechanism, the combination of a circular printing plate, an impression mechanism revolubly mounted in concentric position relative to said printing plate adapted to be operated in connection with said printing plate for making a record, said impression mechanism comprising a radially-extending slideway, an impression member slidably mounted in said slideway, yielding means tending to hold said impression member in its innermost position, and two links adapted when straightened relative to each other in radial position to move said impression member outward for making the record in coöperation with said printing plate, said links being adapted to be buckled relative to each other in either direction.

44. In an indicating mechanism, the combination of a circular printing plate, an impression mechanism revolubly mounted in concentric position relative to said printing plate adapted to be operated in connection with said printing plate for making a record, said impression mechanism comprising a radially-extending slideway, an impression member slidably mounted in said slideway, yielding means tending to hold said impression member in its innermost position, a link pivotally connected with said impression member, a second link pivotally mounted at one end on the axis of revolution of said impression mechanism and pivotally connected at its other end with said first-named link, said links when straightened relative to each other in radial position being adapted to move said impression member outward for making a record in coöperation with said printing plate, and said links being adapted to be buckled in either direction relative to each other.

45. In an indicating mechanism, the combination of a circular printing plate, an impression member revolubly mounted in concentric position relative to said printing plate adapted to be moved outward into operative engagement with said printing plate for making a record, and inking mechanism actuated by the outward movement of the impression member for inking that portion of the printing plate about to be operatively engaged by said impression member.

46. In an indicating mechanism, the combination of a circular printing plate, an impression member revolubly mounted in concentric position relative to said printing plate adapted to be moved outward into operative engagement with said printing plate for making a record, an arm adapted to swing relative to said impression member, a roller mounted on said impression member adapted to engage a cam face on said arm for swinging the arm relative to the impression member as the impression member moves outward, an inking roller movably mounted on said arm, and means for moving said inking roller outward into contact with said printing plate as the said arm is swung relative to the impression member.

47. In an indicating mechanism, the combination of a circular printing plate, an impression member revolubly mounted in concentric position relative to said printing plate adapted to be moved outward into operative engagement with said printing plate for making a record, an arm adapted to swing relative to said impression member, yielding means tending to hold said arm against swinging, a roller mounted on said impression member adapted to engage a cam face on said arm for swinging the arm relative to the impression member as the impression member moves outward, an inking roller movably mounted on said arm, and means for moving said inking roller outward into contact with said printing plate as the said arm is swung relative to the impression member.

48. In an indicating mechanism, the combination of a circular printing plate, an impression member revolubly mounted in concentric position relative to said printing plate adapted to be moved outward into operative engagement with said printing plate for making a record, an arm adapted to swing relative to said impression member, a roller mounted on said impression member adapted to engage a cam face on said arm for swinging the arm relative to the impression member as the impression member moves outward, an inking roller movably mounted on said arm, yielding means tending to hold said inking roller against movement relative to the said arm, and means for moving said inking roller outward into contact with said printing plate as the said arm is swung relative to the impression member.

49. In an indicating mechanism, the combination of a circular printing plate, an impression member revolubly mounted in concentric position relative to said printing plate adapted to be moved outward into operative engagement with said printing plate for making a record, an arm adapted to swing relative to said impression member, a roller mounted on said impression member adapted to engage a cam face on said arm for swinging the arm relative to the impression member as the impression member moves outward, an inking roller movably mounted on said arm, and a pin by a stroke of which said inking roller is moved outward into contact with said printing plate, said pin being adapted to be operated by the first-mentioned roller as the said roller moves outward with the impression member.

50. In an indicating mechanism, the combination of a circular printing plate, and impression mechanism revolubly mounted in concentric position relative to said printing plate adapted to be operated in connection with said printing plate for making a record, said impression mechanism comprising an impression member movable radially toward and from said printing plate, two links adapted when straightened relative to each other in radial position to move said impression member outward for making a record in coöperation with said printing plate, and means for swinging said links into radial position and for swinging them thence in either direction into angular relation to each other.

51. In an indicating mechanism, the combination of a circular printing plate, an impression mechanism revolubly mounted in concentric position relative to said printing plate adapted to be operated in connection with said printing plate for making a record, said impression mechanism comprising an impression member movable radially toward and from said printing plate, and two links adapted when straightened relative to each other in radial position to move said impression member outward for making a record in coöperation with said printing plate, means for swinging said links out of their angular position at one side of their radial position into angular position at the other side, a roll of paper mounted on said impression mechanism and movable therewith about said printing plate, means for leading the web from said roll past the impression member, and means actuated by the swinging of said links in one direction for advancing the web relative to said impression member.

52. In an indicating mechanism, the combination of a circular printing plate, an impression mechanism revolubly mounted in concentric position relative to said printing plate adapted to be operated in connection with said printing plate for making a record, said impression mechanism comprising an impression member movable radially toward and from said printing plate, and two links adapted when straightened relative to each other in radial position to move said impression member outward for making a record in coöperation with said printing plate, means for swinging said links out of their angular position at one side of their radial position into angular position at the other side, a shaft, rollers fixed on said shaft adjacent to said impression member, a roll of paper mounted on said impression mechanism and movable therewith about said printing plate, means for leading the web from said roll past the impression member in engagement with said rollers, a ratchet-wheel fixed on said shaft, and a pawl carried by said impression mechanism adapted to engage said ratchet-wheel upon the swinging of said links in one direction for turning said shaft and said rollers for advancing the web relative to the impression member.

53. In a device of the class described, a part adapted to be displaced a variable amount, and follow up devices adapted to be moved by an independent source of energy to an extent proportional to the variable movement of the aforesaid part, said follow up devices being adapted to be limited in their movement by the aforesaid part and to coöperate with said part to effect the limitation of movement in such a manner as not to tend to impart a movement of displacement to said part.

54. In a device of the class described, a part having a movement of translation to a variable extent in accordance with a given factor, follow up devices adapted to have imparted thereto a movement of translation corresponding to the movement of the part, and means coöperating with the part for limiting the movement of the said follow up devices in accordance with the extent of movement of said part, said means being adapted to coact with the said part in a direction and an angle to the direction of translation of the said part whereby the impact of the said means and said part does not tend to move the part in the direction of its movement of translation.

55. In a device of the class described, a part adapted to be displaced to varying angular extents in accordance with a certain factor, follow up devices also adapted to be moved to varying angular extents, means associated therewith and coacting with said part to limit the movement of the follow up devices in accordance with the extent of angular movement of the said part, said means being adapted to coact with the said part in a radial direction whereby the impact of the means and the part does not tend to displace the part angularly.

56. In a device of the class described, a part rotatable about an axis to varying angular extents, a disk concentric with said axis, said part having a projection extending over the said disk in close proximity to the periphery thereof, a follow up device having a rotational movement about the axis of the part, said device having provisions to coact with the part in an axial direction to thereby simultaneously press the projecting portion of the part axially against the disk to lock the part against movement and to also limit the movement of the follow up devices in accordance with the variable movement of the said part.

57. A structure as specified in claim 54, in which the part is normally freely movable in combination with the limiting means for the follow up mechanism, having provisions to lock the said part at the instant of coaction between the part and said limiting means.

58. A structure as specified in claim 55, in which the part is normally freely movable in combination with the means associated with the follow up mechanism having provisions to lock the said part at the time of coaction between the part and said means.

ELMER E. WOLF.